(No Model.) J. H. CARPENTER, Dec'd. 2 Sheets—Sheet 1.
CLARA J. CARPENTER, Administratrix.
GATE.
No. 328,186. Patented Oct. 13, 1885.
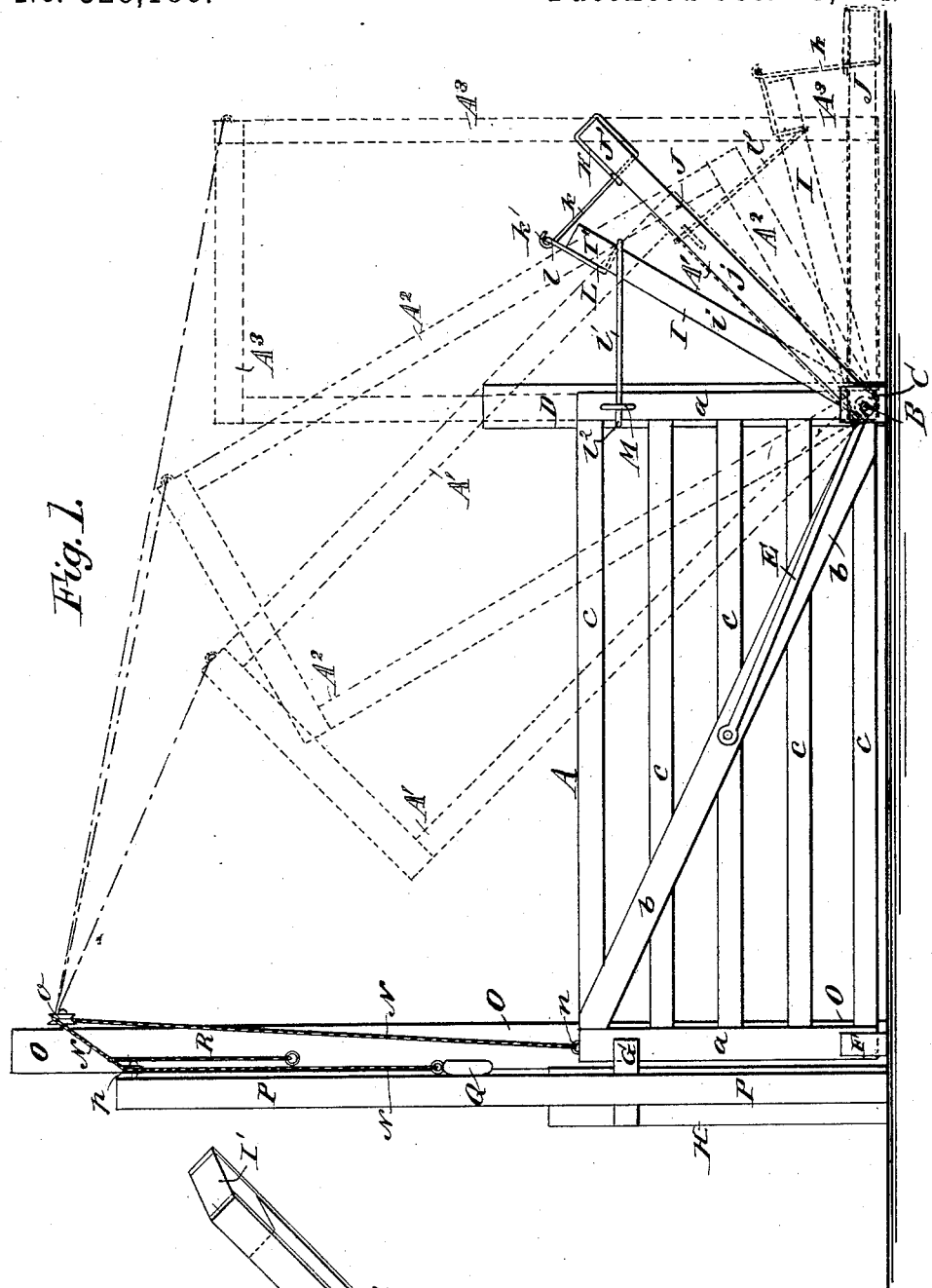
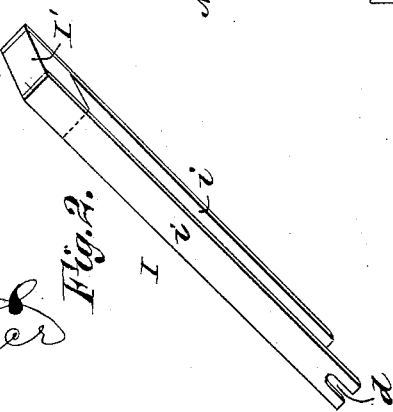
WITNESSES:
Otto Berger
C. Sedgwick
INVENTOR:
J. H. Carpenter
BY Munn & Co
ATTORNEYS.

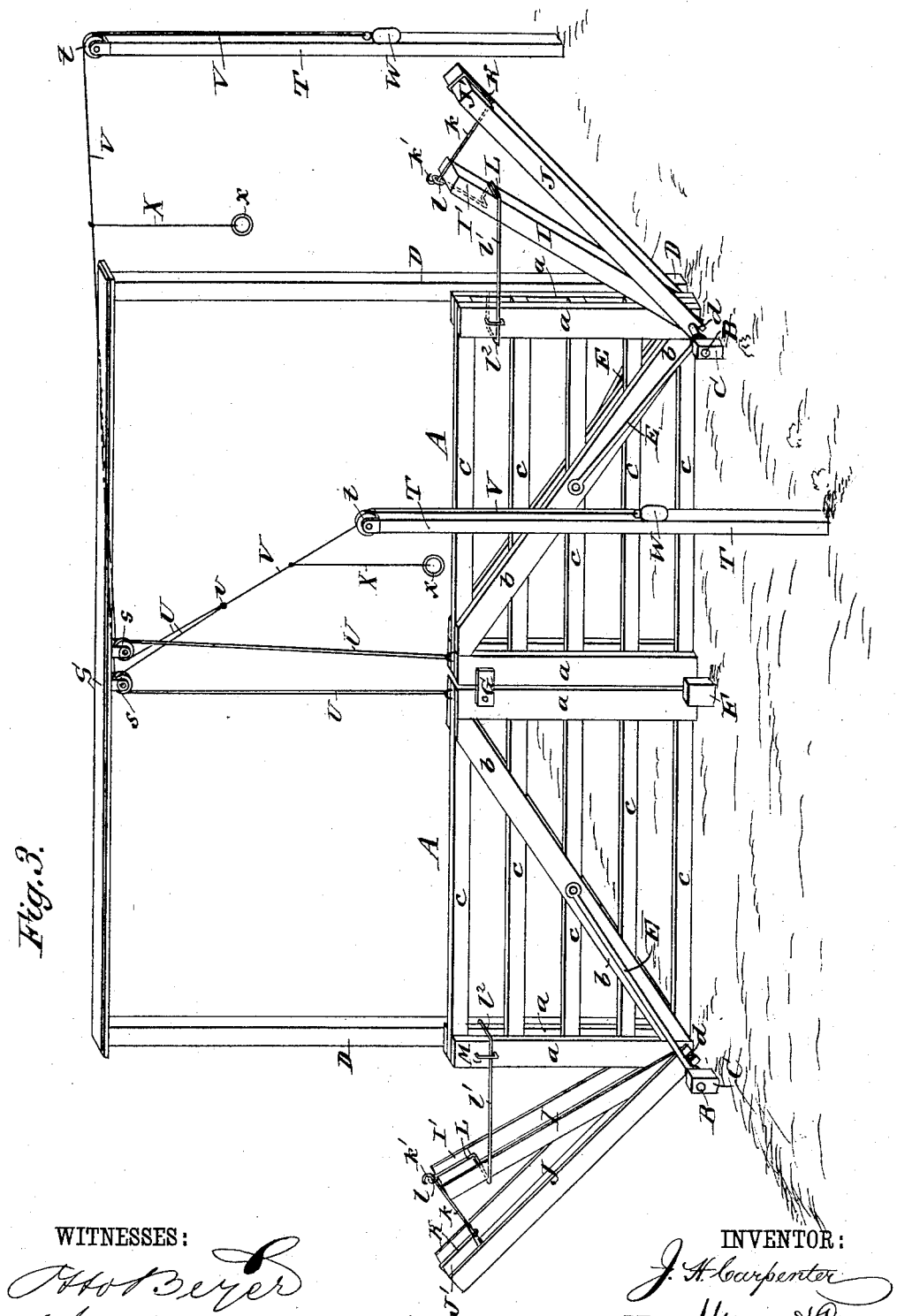

United States Patent Office.

JAMES H. CARPENTER, OF HYNDMAN, PENNSYLVANIA; CLARA J. CARPENTER ADMINISTRATRIX OF SAID JAMES H. CARPENTER, DECEASED.

GATE.

SPECIFICATION forming part of Letters Patent No. 328,186, dated October 13, 1885.

Application filed November 17, 1884. Serial No 148,119. (No model.)

*To all whom it may concern:*

Be it known that I, JAMES H. CARPENTER, of Hyndman, in the county of Bedford and State of Pennsylvania, have invented a new and Improved Gate, of which the following is a full, clear, and exact description.

The object of my invention is to provide cheap, easy-working, and durable gates.

The invention consists in the construction and arrangement of parts, as will be hereinafter described and claimed.

Reference is to be had to the accompanying drawings, forming part of this specification, in which similar letters of reference indicate corresponding parts in all the figures.

Figure 1 is a side elevation of a single gate constructed in accordance with my invention, and showing in dotted lines the various open positions of the gate. Fig. 2 is a perspective view of one of the balance arms or levers of the gate, and Fig. 3 is a perspective view of a double gate constructed in accordance with my invention.

The letter A indicates a gate which is made of opposite pairs of uprights, $a\ a$, and diagonal braces $b$, fixed to the horizontal rails $c$, which is a common construction for gates of this character.

B is a strong pin, which passes through the gate at or near its back lower corner, and through or into posts C D set into the ground, so that the gate may open by swinging upward and backward bodily and edgewise on the pin B as a center of motion.

About at the center of the gate, both ways, I attach the front ends of an opposite pair of braces, E, which extend backward and connect loosely—by eyes, for instance—with the pivot-pin B at opposite sides of the gate, and at such distance therefrom as shall re-enforce the hinge-joint of the gate on the pivot-pin B, and prevent a sidewise swinging movement of the gate as it opens and closes, and while open.

At the outer end of the gate, stakes or short posts F may be set in the ground, so as to stand at opposite sides of the closed gate, and blocks G may be attached to the gate-post H of the single gate, so as to overlap the closed gate on both sides and stay it against side pressure, and for the double gate the blocks G will be attached to the sides of one gate to overlap the sides of the adjacent gate, as shown in Fig. 3.

On the gate-pivot B are set a series of balance arms or levers, which have notches $d$ in their lower ends, into which the pivot enters. One or more of these balance-arms may be used, depending on the number of positions at which it is desired to hold the gate open. I prefer to use two balance-arms, I J, as shown, to provide for three open positions of the gate, as presently explained.

I hold the outer ends or heads of the balance-arms to each other and to the gate by slipping connections, which will hold the upper outer ends of the arms at a certain distance from each other and the gate and allow the arm I to fold down on the pivot B between the sides $j\ j$ of the arm J and below its weight or weight-box J', held by or between the outer ends of the sides $j\ j$, and also allow the back end of the gate to fold down between the sides $i\ i$ of the balance-arm I and inside of its weight-box I', so that when the gate is fully open the balance-arms I J and the back end of the gate will lie in the same plane.

The connections of the balance-arms to each other and the gate may be made in various ways—as, for instance, by a metal bar or strap, K, connected rigidly to the head of arm J, and having a projecting arm, $k$, with a hook end, $k'$, which arm $k$ passes loosely through an eye, $l$, of a bar or strap, L, fixed to the arm I, which bar L has an extended arm, $l'$, passing through a keeper or guide, M, fixed to the back end of the gate, and said arm $l'$ may be bent or looped, as at $l^2$, quite around the uprights $a\ a$ at the back end of the gate, all as shown in the drawings.

The arms I J are weighted, so that when the gate is closed, as in full lines in Figs. 1 and 2, very little power will be required to swing the gate upward on the pivot-pin B, so that a child or weak person may easily open the gate by lifting directly on it, and as the gate swings upward the balance-arm J will strike the ground when the gate has reached its first open position, as at A', Fig. 1, and on releasing the gate it will be held by the balance-arms in this open position, allowing the passage of one person and small animals or fowls through the gateway, and should it be desired to open the gate farther it will be raised until the balance-arm I will fold down to the ground inside of the arm J, the eye $l$ of bar L then slipping down the arm $k$ of bar K, in which position of the arms I J the gate will be balanced by the arms in its second open position, as indicated by the dotted lines at $A^2$, Fig. 1, to allow larger animals or a man on horseback to pass the gateway, and to open the gate fully, so that vehicles may pass, the gate will be raised until its back end will fold down to the ground within the balance-arm I, the arm $l'$ of the tie-bar L then slipping through the keeper M, so that the gate then stands in its third open position, as indicated by the dotted lines at $A^3$, Fig. 1.

As the gate is closing it first will swing over on the pivot B, until its back end rises to the loop $l^2$ of bar L, then the balance-arm I will be lifted and the eye $l$ will slip on the arm $k$ to its hook end $k'$, and finally the balance-arm J will be raised, as will readily be understood.

It is evident that in opening or closing the gate, it may be balanced open by the arms I J in either of the two intermediate positions indicated at $A'$ $A^2$.

The weights at the ends of the balancing-arms I J may consist of a single piece of metal, stone, or other substance; or the arms may have boxes at the ends, as shown, in which removable weights may be placed. The balancing-arms may also be pivoted to the lower back corner of the gate, and may be fitted to the pivot B otherwise than by the open slots $d$; but the latter connection is preferred, as it allows the balancing-arms to be removed at any time without disturbing the pivotal connection of the gate to the ground-posts.

Either the single or double gates may be swung open or shut by pull-cords.

With the single gate, a cord, N, attached to the free end of the gate at $n$, passes over a pulley, $o$, journaled on a post, O, and thence over a pulley, $p$, on the post P, whence the cord hangs, and the cord carries at its end a weight, Q, to keep it taut and from running through the pulleys to the ground. A pull-cord, R, having a ring or hand-grasp, $r$, is attached to the cord N, which cord R may be drawn upon by a person on a horse or in a vehicle, without dismounting or alighting, to open and close the gate.

With the double gate shown in Fig. 3, tall posts will be set at the back ends of the gates, or the posts D, through which the gate-pivots B pass, may be made long, as shown, and be connected by a cross-bar, S, extending over the roadway, to which the pulleys $s$ $s$ are attached, and at the roadside at suitable distances at both sides of the gate are set the posts T, having pulleys $t$.

Two pull-cords, U, are attached to the outer end of each gate, and one pair of cords connecting both gates passes each way over the pulleys $s$ $s$, and connects at $v$ with a cord, V, which passes over a pulley, $t$, of a post, T, and has a weight, W, at the end to keep the ropes taut and off the ground, and a pull-cord, X, having a ring, $x$, is connected to each cord V, so that by drawing on either cord X both gates will be opened or closed at once, the point of junction at $v$ allowing the cords U U to run out sufficiently to let the gates swing fully open.

I have shown the balancing-arms I J in dotted lines in Fig. 1 only in the positions they occupy in the first open position of the gate, as at $A'$, to avoid confusion of dotted lines.

In operating the gates the momentum of the balancing-arms I J is of use, more especially when the gates are swung open by the pull-cords, which are pulled sharply and then released when the gate is to be fully opened, as will readily be understood.

The advantages of my improved gate are its simplicity, cheapness, ease of working, and durability, and its adaptability to work on hillsides or in other situations where the ordinary horizontally-swinging gate cannot be used, and the gate may be opened or closed in light or heavy snows, and cannot be blown open or shut by violent winds.

Having thus described my invention, what I claim as new, and desire to secure by Letters Patent, is—

1. The combination, with a gate pivoted at one lower corner and having an eye, M, above the said lower corner, of the pivoted weighted arm I and the rod $l'$, secured to the arm I and provided with a hook, $l^2$, said rod passing through the eye M, substantially as set forth.

2. The combination, with a gate pivoted at one lower corner, of a series of pivoted weighted arms, I J, connected with each other by a sliding and stop connection, the arm I, next to the gate, being also connected with said gate by a sliding and stop connection, whereby the gate may be swung to and held at different angles, substantially as set forth.

3. The combination, with the gate A, pivoted at B, of the pivoted balancing-arms I J, connected at their outer ends by a bar, K, having an arm, $k$, provided with a stop hook or head, $k'$, said arm I being connected to the gate by a bar, L, having an eye, $l$, inclosing the arm $k$, and an arm, $l'$, passing through a keeper on the gate, and having a stop shoulder or end, $l^2$, substantially as herein set forth.

JAMES H. CARPENTER.

Witnesses:
JACOB CARPENTER,
JACOB EVANS.